US00RE43440E

(19) United States
(12) Reissued Patent
Jespersen et al.

(10) Patent Number: US RE43,440 E
(45) Date of Reissued Patent: May 29, 2012

(54) METHOD FOR PERFORMING A TRANSACTION OVER A NETWORK

(75) Inventors: Torben Jespersen, Dalmose (DK); Kirsten Bruus, Dalmose (DK)

(73) Assignee: Wispo Software Limited Liability Company, Wilmington, DE (US)

(21) Appl. No.: 12/362,953

(22) Filed: Jan. 30, 2009

Related U.S. Patent Documents

Reissue of:
(64) Patent No.: 7,171,694
Issued: Jan. 30, 2007
Appl. No.: 09/624,013
Filed: Jul. 21, 2000

(30) Foreign Application Priority Data

Jul. 21, 1999 (DK) ..... 199901028
Dec. 17, 1999 (DK) ..... 199901817
Feb. 22, 2000 (DK) ..... 200000271

(51) Int. Cl.
*G06F 7/04* (2006.01)
(52) U.S. Cl. ..... 726/27; 726/28; 713/155; 713/156; 713/157
(58) Field of Classification Search ..... None
See application file for complete search history.

(56) References Cited

U.S. PATENT DOCUMENTS 4,802,217 A 1/1989 Michener
4,992,646 A 2/1991 Collin
5,136,646 A 8/1992 Haber et al.
5,671,279 A 9/1997 Elgamal
5,712,914 A 1/1998 Aucsmith et al.
5,732,137 A 3/1998 Aziz
5,883,810 A 3/1999 Franklin et al.
5,903,878 A * 5/1999 Talati et al. ..... 705/26
5,987,140 A 11/1999 Rowney et al.
6,018,724 A 1/2000 Arent
(Continued)

FOREIGN PATENT DOCUMENTS

EP 590861 4/1994
(Continued)

OTHER PUBLICATIONS

"Notice of Allowance", U.S. Appl. No. 09/624,013, (Oct. 5, 2006), 14 pages.

(Continued)

*Primary Examiner* — Pramila Parthasarathy
(74) *Attorney, Agent, or Firm* — Perkins Coie LLP

(57) ABSTRACT

A method for performing a transaction between a legal entity A who has an approval to perform such transaction, and a legal entity B over a network, the transaction being initiated by the legal entity A, wherein the legal entity A, to verify the approval to the legal entity B, associates the transaction with a verification insignia, the verification insignia being a unique transitory insignia provided to the legal entity A by a legal entity C who thereby guarantees that the legal entity A has the approval, the provision of the unique transitory insignia to the legal entity A by the legal entity C being conditioned by the legal entity A providing to the legal entity C a secret identification code confirming the identity of the legal entity A to the legal entity C, the legal entity B validating the unique transitory insignia, and upon positive validation, and only then, accepts the transaction, and the transitory unique insignia being invalidated substantially immediately after the validation.

87 Claims, 3 Drawing Sheets

U.S. PATENT DOCUMENTS

| | | | |
|---|---|---|---|
| 6,047,268 | A | 4/2000 | Bartoli et al. |
| 6,112,304 | A | 8/2000 | Clawson |
| 6,128,738 | A | 10/2000 | Doyle et al. |
| 6,138,107 | A | 10/2000 | Elgamal |
| 6,223,291 | B1 | 4/2001 | Puhl et al. |
| 6,298,153 | B1 | 10/2001 | Oishi |
| 6,314,521 | B1 | 11/2001 | Debry |

FOREIGN PATENT DOCUMENTS

| | | |
|---|---|---|
| IE | 990240 | 10/1999 |
| WO | WO-9834203 | 8/1998 |
| WO | WO 9949424 | 9/1999 |
| WO | WO-9949424 | 9/1999 |
| WO | WO 0049586 | 8/2000 |
| WO | WO-0049586 | 8/2000 |

OTHER PUBLICATIONS

"Final Office Action", U.S. Appl. No. 09/624,013, (Apr. 11, 2006), 19 pages.
"Non-Final Office Action", U.S. Appl. No. 09/624,013, (Sep. 29, 2005),21 pages.
"Advisory Action", U.S. Appl. No. 09/624,013, (Jul. 18, 2005),2 pages.
"Final Office Action", U.S. Appl. No. 09/624,013, (Jan. 11, 2005), 17 pages.
"Non-Final Office Action", U.S. Appl. No. 09/624,013, (Jan. 22, 2004), 16 pages.
Harris, et al., "Digits", *The Wallstreet Journal,* (Jul. 1999),p. 1.
Lawlor, Maryann "Digital Credentials Kick Off New Commerce Procedures", *Signal,* (Aug. 1999),pp. 27-30.
Wahab, et al., "Biometrics Electronic Purse", *IEEE,* (1999),pp. 958-961.
Zoysa, et al., "Bi-directional Web Document Protection System for Serious E-commerce Applications", *IEEE,* (2002),pp. 1-6.
Jamaluddin, et al., "Date Time Stamping with Digital Signature Infrastructure", *IEEE,* (2002),pp. 102-104.
Patsuris, P. "Amex's Private Payments Aimed More At Fears Than Reality", http://biz.yahoo.com/fo/000908/mu3397.html, (Sep. 8, 2000).
"American Express Continues 150-Year Tradition of Protecting Customers with New Suite of Online Privacy and Security Products", http://home3.americanexpress.com/corp/latestnews/payments.asp, (Sep. 7, 2000).
Berger, M. "American Express combats online fraud", http://www.upside.com/News/39b7eb250, (Sep. 7, 2000).
D'Innocenzio, A. "AMEX To Offer Disposable Numbers", http://dailynews.yahoo.com/h/ap20000907/tc/amex_online_payment_2.html, (Sep. 7, 2000).
""American Express to offer one-use credit card numbers," Yahoo!", *Canada News Technology Headlines,* (Sep. 7, 2000).
"AmEx Launches Web Security Products", http://dailynews.yahoo.com/htx/nm/20000907/wr/amex_security_dc_2.html, (Sep. 7, 2000).
"Advisory Action", U.S. Appl. No. 09/624,013, (Jul. 18, 2005), 2 pages.
Harris et al, Digits, Jul. 1999, The Wallstreet Journal, p. 1.*
Lawlor, Maryann, Digital Credentials Kick Off New Commerce Procedures, Aug. 1999, Signal, pp. 27-30.*
Wahab et al., Biometrics Electronic Purse, 1999, IEEE, pp. 958-961.*
Zoysa et al, Bi-directional Web Document Protection System for Serious E-commerce Applications, 2002, IEEE, pp. 1-6.*
Jamaluddin et al, Date Time Stamping with Digital Signature Infrastructure, 2002, IEEE, pp. 102-104.*
Patsuris P., "Amex's Private Payments Aimed More At Fears Than Reality", http://biz.yahoo.com/fo/000908/mu3397.html, Sep. 8, 2000.
"American Express Continues 150-Year Tradition of Protecting Customers with New Suite of Online Privacy and Security Products," http://home3.americanexpress.com/corp/latestnews/payments.asp, Sep. 7, 2000.
Berger, M., "American Express combats online fraud," http://www.upside.com/News/39b7eb250, Sep. 7, 2000.
D'Innocenzio, A., "AMEX To Offer Disposable Numbers," http://dailynews.yahoo.com/h/ap20000907/tc/amex_online_payments_2.html, Sep. 7, 2000.
"American Express to offer one-use credit card numbers," Yahoo! Canada News, Technology Headlines, Sep. 7, 2000.
"AmEx Launches Web Security Products," http://dailynews.yahoo.com/htx/nm/20000907/wr/amex_security_dc_2.html, Sep. 7, 2000.

* cited by examiner

METHOD FOR PERFORMING A TRANSACTION OVER A NETWORK

Matter enclosed in heavy brackets [ ] appears in the original patent but forms no part of this reissue specification; matter printed in italics indicates the additions made by reissue.

FIELD OF THE INVENTION

The present invention relates to a method for performing transactions over a network and a method of verifying the approval of a customer to perform such a transaction.

The present invention is primarily concerned with secure payment over an electronic network.

DESCRIPTION OF THE PRIOR ART

Generally speaking, two types of Internet transactions take place. One type relates to transactions wherein a relation exists between the parties of the transaction, e.g. customer logs into a host side where a specific service can be traded. By means of the login procedure, the customer is identified towards the service provider and the service provider can then, based upon the identification chose if the transaction should be carried out or not. Due to the existing relationship between the parties, payment related to the transaction could be arranged either prior to the transaction or after the transaction. Another type relates to transactions wherein no specific relationship exists between the parties. In this case a service provider would typically require payment upon receive of the service, e.g. by means of a payment card number.

The existing payment cards, issued by national or international card companies, are today used to pay for shopping on the Internet, to guarantee for late hotel arrival or to book tickets over the phone.

However, It has been found that the use of these cards is connected with a certain risk of fraud. Today, several different, technical solutions have been developed to minimise the risk (SSL, SET and others). The existing solutions are characterised by high complexity, which makes the solutions inconvenient and expensive to implement, and as a result, the users of payment cards are reluctant to use the cards on the Internet.

Not only the users of payment cards but also the organisations and companies servicing the identification used in international interchange, e.g. the organisations and banks behind the payment cards are looking for secure, reliable and cheap solutions for customer identification and verification without the presence of a payment card in form of a smart cart or similar plastic card.

DESCRIPTION OF THE INVENTION

The objective of the described invention is to eliminate the before mentioned risk of fraud, and to develop a simple, easy and cheap solution to the security problem of identification and verification used for international interchange transactions over an electronic communication channel. The verification could be implemented as a part of a payment transaction, e.g. between the customer, a bank and a shop.

Accordingly the present invention relates to a method for performing a transaction between a legal entity A who has an approval to perform such a transaction, and a legal entity B over a network, the transaction being initiated by the legal entity A, wherein the legal entity A, to verify the approval to the legal entity B, associates the transaction with a verification insignia, the verification insignia being a unique transitory insignia provided to the legal entity A by a legal entity C who thereby guarantees that the legal entity A has the approval, the provision of the unique transitory insignia to the legal entity A by the legal entity C being conditioned by the legal entity A providing to the legal entity C a secret identification code confirming the identity of the legal entity A to the legal entity C, the legal entity B validating the unique transitory insignia, and upon positive validation, and only then, accepts the transaction, and the transitory unique insignia being invalidated substantially immediately after the validation.

The person or legal entity A could as an example be a customer who wants to buy items or services over the Internet from the person or legal entity B who could be an Internet service provider, such as an Internet shop. It could also be a person who by means of a phone call, makes a hotel reservation and guarantees for late arrival. The network could therefor be any kind of communication channel such as a private channel or public channel and it could be a secure channel as well as a non-secure channel.

The legal entity A or the customer has previously been approved by a financial partner such as a bank, a credit company, or by a shop or institution issuing payment cards, e.g. credit cards, debit cards or customer cards. The approval could be identified by means of a contract number between the customer and the financial partner or by means of a payment card issued by the financial partner to the customer. The approval e.g. in form of a payment card thus indicates towards a third party that the financial partner vouches for the payment of at least a pre-specified amount of money upon pre-specified conditions.

According to the present invention the legal entity A verifies the approval by the financial partner to the legal entity B, by associating the transaction with a verification insignia. In some cases the transaction in it self is the provision of the verification insignia from the legal entity A to the legal entity B. That could be if the only purpose of the transaction is for the legal entity A to show or prove to the legal entity B that the approval exists. As an example the legal entity A could simply send the verification insignia to the legal entity B. The legal entity A could be a customer who wants pay for items bought in a shop and the verification insignia could be directly reimbursable with a payment through a bank transaction.

Normally and according to the prior art the verification insignia would be the number and expiry date of a payment card, which number and expiry date the customer would send over the communication channel being the Internet, a phone line etc. The problem is that the payment card number and expiry date can be abused. In case the payment card number is send on a protected, private or semi-private communication channel the payment card could be abused by the person intended to receive the card number. The person could as an example withdraw an extra amount from the payment card account a few days or month after the transaction took place. If the payment card number and expiry date is send on a non-protected communication channel, anyone may listen to the communication and thus abuse the payment card.

According to the present invention the verification insignia is a unique transitory insignia provided to the legal entity A by a legal entity C who thereby guarantees that the legal entity A has the approval, e.g. that the legal entity A is in the possession of a valid payment card or at least that the legal entity A has a valid agreement with a financial partner, to perform such transactions. Typically an approval means that the financial partner—typically a bank—assures payment of up to a certain limit for that customer, on the condition that certain conditions are fulfilled, e.g. that the customer has provided a correct payment or cheque account number, expiry date etc. The legal entity C could be any legal and trusted partner of the financial partner. The legal entity C could as an example have access to information about the customer. The financial partner could provide such information to the legal entity C as part of their internal agreement. As an example, the financial partner could be a bank, an insurance company, a shop or a gas station and the legal entity C could be a payment card issuing company or any other company issuing warrants. Based on the connection between the financial partner of the legal entity A the legal entity C is capable of guaranteeing for the approval such as guaranteeing that the customer is in the possession of a valid payment card, a valid credit agreement, a valid bank account with a certain credit rating etc.

The unique transitory insignia thus serves the purpose of verifying the ability of the customer to fulfil the transaction, e.g. to pay an amount of money. The unique transitory insignia may by directly reimbursable with the payment, e.g. through a bank or through a payment card institution. This is similar to the present use of smart cards or other physical payment cards but without having a physical card.

The unique transitory insignia could also serve other purpose, e.g. the purpose of verifying the identity of the legal entity A, or at least to verify that A is in the possession of an agreement with the financial partner. Such agreement could lead to a certain discount or a certain service, e.g. admittance to lounges in the airport, discount at the gas station etc.

Upon receive of a secret identification code such as a login name followed by a password the legal entity A, the customer, receives a unique transitory insignia. By means of the secret identification code provided by the legal entity A to the legal entity C, the identity of the legal entity A has been proved. By means of the relationship between the financial partner and the legal entity C, the legal entity C can either choose simply to guarantees that the legal entity A has the approval, or the legal entity C can choose to seek confirmation for the approval. Such confirmation could be achieved e.g. by contacting the financial partner or by searching in a database provided to the legal entity C by the financial partner. It could even be that the legal entity C is the financial partner who has given the approval to the legal entity A and in that case no further confirmation is necessary.

When the legal entity B receives the unique transitory insignia, the legal entity B validates the unique transitory insignia e.g. by contacting the legal entity C, the financial partner of the legal entity A or by contacting any other trusted partner of the legal entity C. As an example the legal entity C could be a bank or a payment card issuing company. When a shop wants to validate the insignia, the shop contacts its local payment card supporter such as its own bank. The bank is authorised to seek validation from the legal entity C or from other trusted partners of the legal entity C. The legal entity B could also seek validation by searching in a database possessed by the legal entity B and updated by the legal entity C or trusted partners of the legal entity C.

After validation of the unique transitory insignia, the legal entity B accepts the transaction, e.g. by forwarding a transaction confirmation to the legal entity A.

Once the unique insignia has been validated it is being marked as invalid by the legal entity C. This may be done as the legal entity B requests validation at the legal entity C or a trusted partner of the legal entity C. It may also be done by the legal entity A, when the confirmation is received from the legal entity B, forwards the confirmation to the legal entity C and it may be done by the legal entity C after a certain timeout period from the time when the unique transitory insignia is being provided by the legal entity C. The time between the validation of the unique transitory insignia and the time when it is marked invalid should be as short as possible. As an example a customer (the legal entity A) has transmitted a unique transitory insignia to a shop (the legal entity B) in order to pay for items. The shop validates the unique transitory insignia by requesting validation at the local bank. The local bank, who is a trusted partner of the legal entity C, requests the validation by the legal entity C, who confirms the validity of the unique transitory insignia and immediately thereafter invalidates the unique transitory insignia so as to ensure that no one else can use that unique transitory insignia.

According to a preferred embodiment of the invention the validation is guaranteed by the legal entity C who upon the guaranteeing invalidates the unique transitory insignia as fast as possible. When the unique transitory insignia is both provided and validated by the legal entity C, it is possible to validate and invalidate the unique transitory insignia instantaneously and without having to communicate on a line which is possibly being taped. It is also an advantage that the same legal entity is responsible both for the validation and invalidation of the unique transitory insignia.

A timestamp could preferably be recorded by the legal entity C or recorded by the legal entity A respectively upon the legal entity C's or the legal entity A's transmission of the unique transitory insignia and indicating the time of the transmission. The timestamp could be stored in a database system, e.g. owned by the legal entity C. The timestamp could serve for the purpose of logging the events of the unique transitory insignia and it could serve for the purpose of invalidating the unique transitory insignia after a pre-specified time interval, either counted from the time when the unique transitory insignia was transmitted by the legal entity C or by the legal entity A.

The timestamp or timestamps recorded by one or both of the legal entities A and C could be provided together with the unique transitory insignia, e.g. coded with a secret coding system, so that the timestamp can not be changed by others. The advantage of providing the timestamp(s) together with the unique transitory insignia is that the legal entity who is going to validate the unique transitory insignia can determine, by evaluating the data included in the unique transitory insignia, how long time the unique transitory insignia has existed and when it was transmitted respectively to the legal entity A and to the legal entity C. The evaluation is important for determining the potential of fraud in connection with that unique transitory insignia. If the timestamp is not provided together with the unique transitory insignia, the same evaluation may be performed but in that case the timestamp will have to be retrieved e.g. from a database system. The recording of the timestamp(s) in a database system could be performed by the legal entity C at the time when the legal entity C provides the unique transitory insignia to the legal entity A.

The pre-specified time interval specifying when to deem a unique transitory insignia invalid should be selected so that the risk of fraud is minimised. The risk of fraud exist already from the time the unique transitory insignia is transmitted from the legal entity C to the legal entity A and the risk is amplified for each transmission taking place or for each person receiving the unique transitory insignia. Of course the risk may be minimised or even eliminated by the introduction of advanced coding system and/or the use of protected communication channels. However, the pre-specified time interval may be calculated as a function of the number of times the unique transitory insignia is transmitted between legal entities. It has been found that transactions, e.g. over the Internet or by means of similar electronic network, such as a WAP cellular phone can be performed in less than a second and therefor it should preferably be possible to invalidate a unique transitory insignia in less than a second from the time when it is being provided from the legal entity C to the legal entity A. For certain occasions, e.g. when working on a low speed network, or when working with a complicated transaction the time between the provision of a unique transitory insignia and the time when that unique transitory insignia is invalidated may have to be longer, e.g. 5 minutes. For some transactions it may even be found that the unique transitory insignia may live much longer after the provision of the unique transitory insignia from the legal entity C. As an example the unique transitory insignia may be passed to the legal entity A on a secure transmission channel. After having received the unique transitory insignia the legal entity A could wait for a short time. From the time when the legal entity A transmits the unique transitory insignia to the legal entity B, a time counter is started. The timestamp could either be a timestamp recorded in a database or a timestamp provided with the unique transitory insignia. When a pre-specified time, since the unique transitory insignia was provided to the legal entity B by the legal entity A is passed, the unique transitory insignia is invalidated and can thus not be used for performing transactions any longer.

It has been found that the pre-specified time preferably should be between 10 millisecond and 5 minutes, such as between 30 seconds and 4 minutes, such as 2 minutes.

According to a preferred embodiment of the present invention at least one of the following events is recorded by the legal entity C:

- the provision of the unique transitory insignia,
- the association of the transaction with the verification insignia,
- the verifying of the correctness of the unique transitory insignia, and
- the time when the transitory unique insignia is being invalidated.

The recording of the provision of the unique transitory insignia could comprise the recording of the identity of the legal entity A, the relationship between the legal entity A with the financial partner who as given the approval, the identity of the financial partner, a time of the provision (a timestamp) and optionally an economically related limitation of the unique transitory insignia. The economically related limitation could be an amount of money that maximally may be related to the unique transitory insignia, a rate of interest related to the money or a fee for reimbursing the unique transitory insignia.

The recording of the association of the transaction with the verification insignia could comprise recording of the time of the association, the identity of the legal entity B, an amount of money related to the transaction in question and eventually other historical data related to the transaction such as a transaction number etc.

The recording of the verifying of the correctness of the unique transitory insignia could comprise recording of the time of the association, the identity of the legal entity who verifies the correctness of the unique transitory insignia, an amount of money that the legal entity B wants to relate to the unique transitory insignia etc.

The recording of the time when the transitory unique insignia is being invalidated could be associated with recording of the reason for invalidating the unique transitory insignia.

The communication channel for communicating the unique transitory insignia could preferably be the Internet or a similar network adapted for the use of cellular phones with a wireless application protocol such as the WAP protocol. Since such communication channels often can be taped by other people than those involved in the transaction and for whom the unique transitory insignia is intended, the communication channel may preferably be protected. For the protection of the channel a secret identification code could be used. The code could either be used for encryption and decryption of the data transmitted on the communication channel or it could be used simply to identify the legal entities towards each other. The protection of the communication channel is mostly important for the transaction between the legal entity A and the legal entity C, when the legal entity C upon verification of the identity of the legal entity A, provides the unique transitory insignia.

According to a preferred embodiment of the invention the unique transitory insignia has a unique identification number which could be associated with a financial agreement. The financial agreement could be related to a bank account or a disbursement account between the legal entity A and the legal entity C or a trusted partner of the legal entity C.

The trusted partner of the legal entity C could be a bank, a shop issuing payment cards, an insurance company or similar companies or institutions issuing approvals e.g. to customers for shopping by means of payment cards, cheques etc. The legal entity C should have access to confirm the approval of the legal entity A.

The unique identification number could preferably have at least a first and a second identification component. The first identification component could identify the financial agreement and could therefore be related to the number of a bank account, a payment card, a cheque or travellers cheque etc. The second identification component could identify the legal entity C or the trusted partner of the legal entity C who may be the financial partner of the legal entity A. The second identification component could be assigned to the legal entity C by a registration authority agreed between the legal entity C and a number of trusted partners of the legal entity C. Such registration authorities are known, e.g. for issuing payment cards.

By means of the unique transitory insignia the legal entity B could request payment according to the agreements of the transaction between the legal entity B and the legal entity A. The payment could be requested e.g. towards the legal entity Bs financial partners who could then request the money towards the legal entity C who issued the unique transitory insignia or they may even request the money directly towards the financial partner of the legal entity A. The payment could e.g. be withdrawn directly from a disbursement account, bank account, check account, customer account or similar account of the legal entity A. It is therefor an advantage if the unique number of the unique transitory insignia is selected in accordance with a unique number of the payment card. The unique number of the unique transitory insignia could e.g. comprise the number of a payment card, a bank account, a cheque account or customer account of the legal entity A.

The unique number is preferably selected in accordance with a unique issuer identification number of the legal entity C or in accordance with a unique identification number of a trusted partner of the legal entity C such as in accordance with a unique identification number of the financial partner of the legal entity A.

According to a preferred embodiment of the invention the unique identification number is selected from a pool of numbers agreed between the legal entity C and the trusted partners of the legal entity C. The numbers may be allocated to the legal entity C or trusted partner of the legal entity C and therefore others can very fast discover the issuer of the unique transitory insignia just be evaluating the number. After the unique transitory insignia is invalidated the number of the unique transitory insignia could be released so that the legal entity C or the trusted partner of the legal entity C later can use that number in connection with other transactions.

According to a preferred embodiment of the present invention the unique transitory insignia is comprised in a digital code. The digital code could be generated by a computer program either by the legal entity C or by the legal entity A. The digital code could also be generated by a cellular phone such as a WAP cellular phone capable of connecting to the legal entity C, retrieve the unique transitory insignia and translate it into a digital code that can be transmitted to the legal entity B. The digital code may even be encrypted in order to further improve the security.

It is expected, that the invention will bring a new dimension into the field of electronic payment security.

DETAILED DESCRIPTION OF THE INVENTION

A preferred embodiment of the invention will now be described in details with reference to the drawing in which.

A network for transactions would typically have a number of participants e.g. a number of customers and a number of service providers. The service providers could be shops where items can be purchased, financial service providers handling economical issues of transactions or it may be providers of Internet services such as providers of Interconnections or providers of secured communication channels over the Internet.

In the following example companies administering payment cards could be any company administering credit cards, debit cards or customer cards. It could be a financial company such as a bank, transaction institutions such as payment card issuing companies (VISA/MASTERCARD, EUROCARD etc), a commercial firm or shopping group or an oil company such as SHELL or it could be a telephone company issuing payment card for phoning.

In the following example the Internet is described as communication channel for the trade. It may be any public or semi-public as well as private or semi-private communication channel, e.g. a privately owned Intranet of a company, a phone line connection between transacting persons or companies etc.

Figure 1:
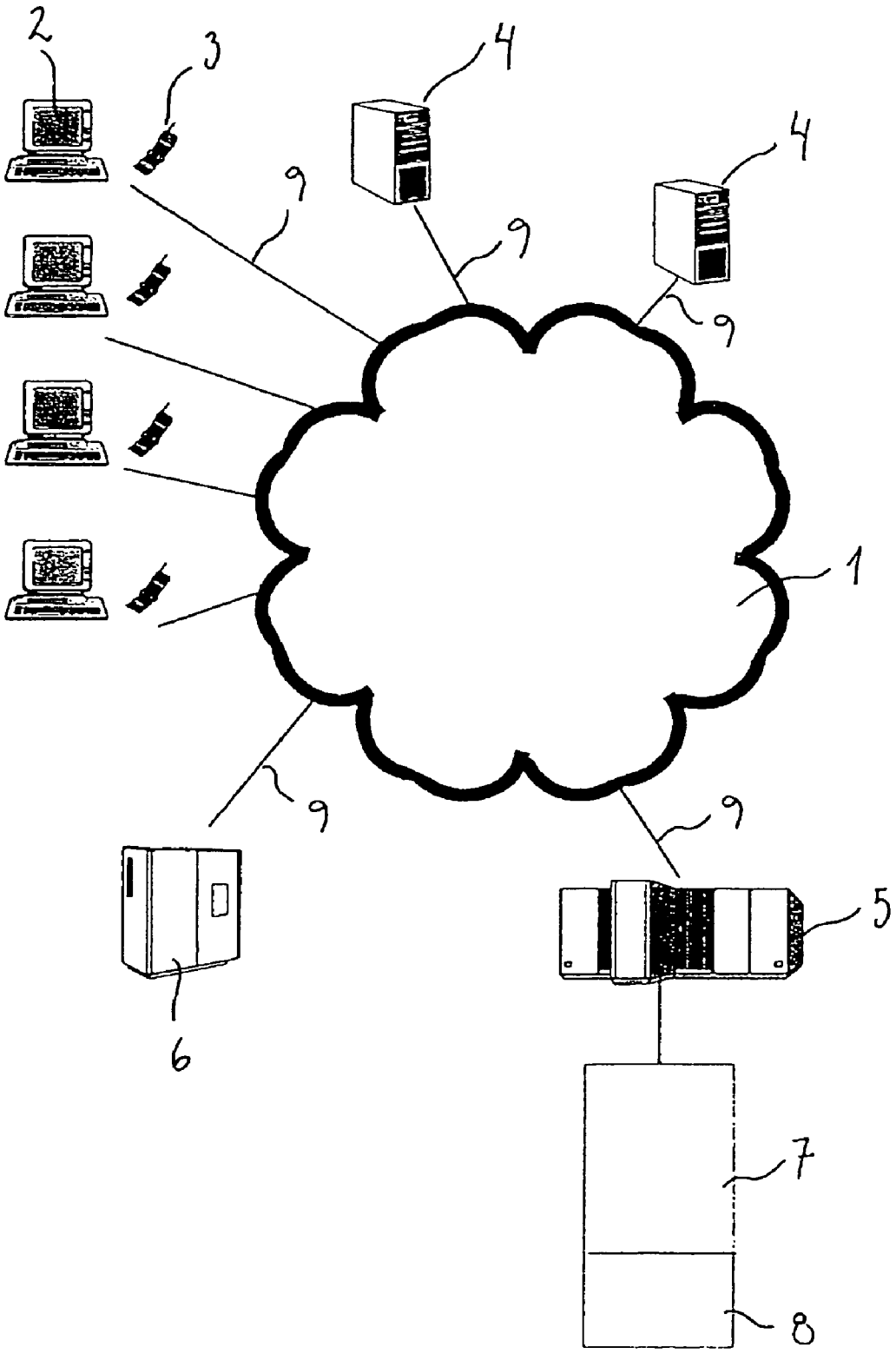
FIG. 1 shows an overview of a network for transactions.

FIG. 1 shows an overview of a network comprising a public network 1 such as the Internet. A customer may be connected to the Internet via a personal computer 2 connected to the Internet 1 or via a mobile phone 3 with a WAP communication line to a WAP server directly connected to the Internet or at least reflecting parts of the Internet. A service provider such as an Internet shop may be connected to the Internet by means of an Internet server system 4. A payment card issuing or administering company may be connected by means of the server system 5. The system is visualised with a database of issued cards 7 and a database of free cards 8. A bank or similar local or global provider of financial services may be connected by means of the server 6. Both the bank and the The customer, the Internet shop, the payment card administering company and the bank may be connected to the Internet by means of connection lines 9, such as via public phone lines or via wire less cellular phone lines or by means of a dedicated private cable connection. The connection may be serviced by any available Internet service provider and through any available software solution such as Microsoft explorer, Netscape etc.

The customer could be connected either from a private PC or WAP mobile phone device or from a public available Internet connection e.g. from an Internet connection offered by the customer's employer, a connection offered in an airport, in a restaurant etc.

The Internet shop would typically have an Internet server or at least have long term access to an Internet server. The Internet server serves an application dedicated to performing transactions over the Internet, e.g. the server enables a customer to retrieve information on product items. The customer could be invited to register items in a "Internet shopping basket" and to select a method of payment. Typically customers are invited to send a payment card number and an expire date to the Internet shop and the Internet shop is authorised to withdraw an amount from an account associated with the payment card number within a specified time from shipping of the items.

The payment card system or Internet bank would typically posses advanced internet solutions with the capability of arranging secure Internet communication lines between the server and the customers of the bank or payment card system. Such solutions are known and typically they are based on the customers possessing unique identification means such as a user name and a password.

Figure 2:
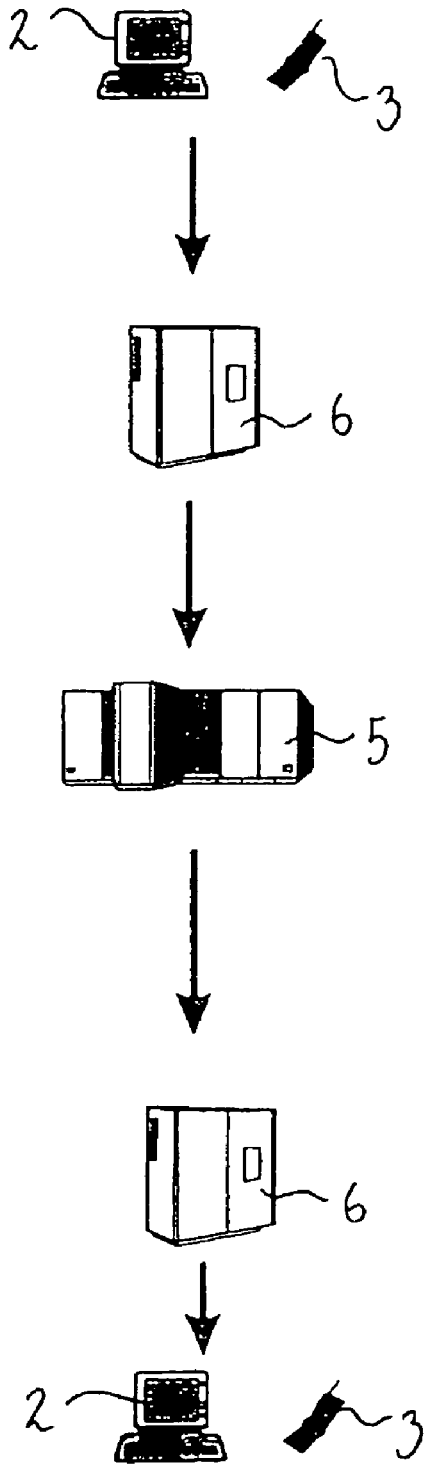
FIGS. 2 and 3 shows a functional transaction flow.
Figure 3:
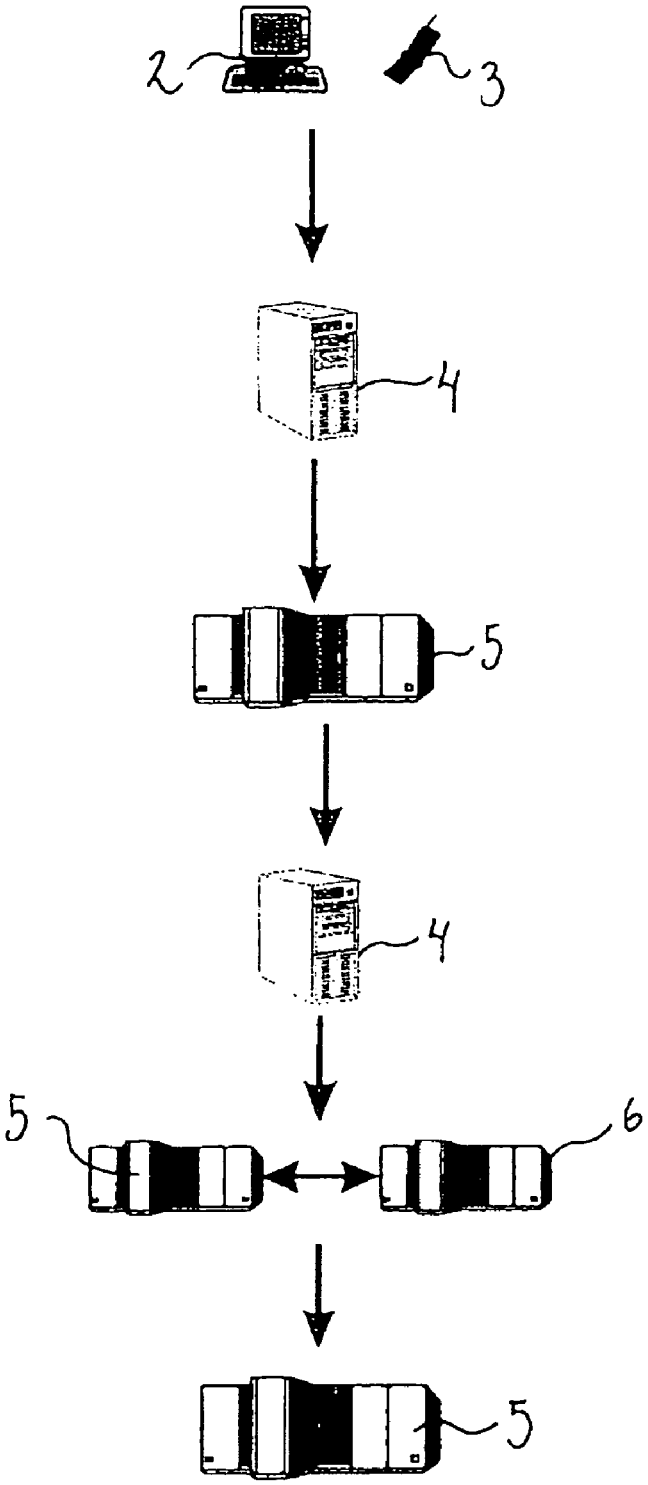

Referring to FIG. 2 a typical transaction comprises the following steps:

1. The customer connects to an Internet bank or to a payment card issuing company. The connection is secured so that other Internet users can not see the communication or at least so that other Internet users can not interpret the communication. By means of the connection the customer ask for an Internet payment tool, which is given by means of a virtual payment card number with an expiry date. That the number is virtual means that exactly that number and expire date can not be found on any real plastic payment cards. The number is issued by the bank or the payment card issuing company like numbers of real payment cards, but the number is registered to be deemed invalid either shortly after the issuing of the number, shortly after the use of the number by the customer or shortly after the first shop has tried to validate the correctness of the payment tool. This will be described in further details later.
2. At the Internet bank, the inquiry is associated with the customers existing relation with the Internet bank, e.g. associated with an existing payment card issued to that customer. The Internet bank or the card issuing company on request from the Internet bank allocates a virtual, non-physical payment card number and all relevant data is logged in a file. The file could either be stored at the Internet bank, or if the Internet bank is not capable of registering issued virtual payment card numbers, the file may be transferred to a respective payment card company or to the respective system for administering the issuing of such payment cards. The virtual payment card numbers would typically have to be registered in the same database system as the real payment card numbers. In that way the administration of the issuing and registration of the payment card numbers as well as the registration of the relationship between an issued virtual and an issued real payment card is more efficient and safe.

3. The system for administering the issuing of payment cards has a database with the issued real payment card numbers and a database with the issued virtual payment card numbers. The virtual payment card number, which has been send to a customer on a secured connection is registered as and looks like the number of a regular payment card, even in the case that the customer has never received a real payment card such as a smart card. The card number is marked as being in use by the customer and a timer is activated. The expiry date could be set e.g. equal to an expiry date of the customers already issued physical card. An on-line transaction containing the virtual card number together with the expiry date is returned to the Internet bank.
4. The Internet bank returns the issued virtual payment card number to the customer. The virtual payment card number is only valid either for a certain time period or until the first transaction has taken place for that card number.
5. The virtual payment card number is received by the customer. The number is received on a computer over the Internet, or by the use of a WAP cellular phone etc and since the communication channel is protected, no one else can get the number. The virtual payment card number may not even be visualised to any one (customer or the shop where the customer intends to use the virtual payment card number). By means of a WAP cellular phone, the virtual card number could simply be an electronic insignia, coded in a secret format so that only the issuer of the virtual card number can verify the card number.
6. The customer connects to an Internet shop—or the customer has already made a connection to the Internet shop, so he has 2 sessions/connections running, one to the Internet bank and one to the Internet shop—and marks a number of items to purchase, if he has not already done so. For the payment the customer enters the virtual payment card number and the expire date.
7. The Internet shop receives the data, including the payment card number from the customer and forwards the number to the system administrating the respective payment card for verification. The Internet shop can not see the difference between the virtual payment card number and a regular payment card.
8. The administrating system validates the payment card number and returns a confirmation to the Internet shop. At the same time the administrating system disables further use of that payment card number.
9. The Internet shop receives the confirmation and confirms the Internet trade towards the customer. The purchased items may now be shipped.
10. Settlement transactions will be send between the involved parties as usual.
11. When the settlement transactions have taken place the payment card number will be allocated for other transactions and the association between the number and the customer will be deleted. The transaction data will be stored for the purpose of tracking the events in case of dispute or faults and for making account statements for the customer.

The invention thus covers the use of a virtual or non-physically existing, electronic payment card, with the characteristic of being short-lived and only valid as long as the electronic verification transactions are being processed. After the transactions or already when the existence of the payment card has been verified towards the Internet shop, the virtual card is made invalid and after the transactions the virtual payment card cease to exist. Contrary to a "real" payment card such as smart cards the virtual card works as a short-lived, once-only card.

The invention has several fields of application such as listed below:

1) Secure means of payment on the Internet provided that the person in question already has a physical, valid payment card such as a smart card.
2) As secure means of payment on the Internet without the person in question possessing a payment card.
3) As secure means of payment on the Internet either with or without a real, physical payment card, issued by e.g. department stores, supermarkets, mail order companies, gas oil companies, business chains or others interested in issuing payment cards, e.g. in order to increase there sale on the Internet.
4) As identification of a person or company to another person or company as the invention inherently contains an identification process.

Other fields of application may be considered.

AD 1: Secure means of payment on the Internet provided that the person in question already has a physical, valid payment card.

The virtual payment card is issued on request, e.g. on-line over the Internet on a secured communication channel owned by a company administering a payment card system or owned by a bank.

As an example a customer may sign up an agreement with a bank for a real payment card. At that time the customer explains the need of Internet shopping and the bank issues a user name and a password for connection to a secure communication line on the Internet.

When the cardholder wants to make a payment on the Internet, he connects to the card company's system/Internet bank or similar system, selects the menu e.g. "Internet Payment", and receives a virtual card number and a date of expire. At this point, the particular virtual card number is marked in the database as a valid card number issued to the cardholder and it is also time-stamped (date, hour, min. sec.), to give a complete unambiguous identification, and a Timer X (for this particular card number) is activated.

The virtual card number and expire date are now used as usual to carry out the payment for goods bought at an Internet-shop. When the verification-process is finished, which is usually the case within 8 seconds or if a specified amount of time has passed—counted by the Timer X, without the card number has been used, then the card number is timed-out and made invalid in the card database. The virtual, electronic card acts as a once-only card. A copy of the card number together with all relevant data is made (log-file), as documentation for the payment made/not used virtual card.

The invention is based on the idea, that the card numbers, which are issued to the virtual cards, is taken from the pool of free card numbers, normally used when issuing new, physical cards. As the person, who wants to make a payment on the Internet already has a valid, physical card, there is no need to go through the normal application procedure.

Therefore it is safe to assign and send the virtual card number directly (electronically) to the customer via the Internet. It is only the virtual card number and expire date, which is used, to make the payment.

The virtual card number will, to the different computer systems involved in the transactions, look exactly like a normal, valid physical card issued to the person in question, which means: no change to the existing payment infrastructure.

When the payment has taken place (exchange of the settlement transactions), the virtual card number is placed as the last, free card number in the card database. In effect, the pool of free, physical card numbers is dynamically used as virtual card numbers. The fact, that the use of virtual card numbers, which in contents and structure already follows the agreed standards for the different payment card systems, and as it is merely an activation of a card (like issuing a new, physical card), results in the great advantage, that the receiving computer systems software and the charging infrastructure need not to be changed.

The invention can be used by all existing and future card companies all over the world, and can be implemented successively by the different card companies. There is no way the virtual card can be tampered with, as each card is individual identifiable and as such can be regarded as a "once-only"-card or as a disposable card. The virtual card exists and is valid only during the verification process, e.g. 8 seconds.

AD 2. As secure means of payment on the Internet without the person in question having a physical payment card.

As the invention is based upon the fact that the person who wants to make an Internet payment must connect to his card company's system/Internet bank, then it is implicit that the person already is known and accepted as customer of the system in question. This already established customer relationship could be used to give the customer (or certain customer groups) the opportunity to pay on the Internet without any physical payment card being issued. The system/the Internet bank in question is able to mark the customers in their database, who are allowed to pay on the Internet without having a physical card issued. When such a customer connects to the card company—or Internet bank and reaches the menu point: "Internet Payment" the system checks, if this particular service is valid for this customer. If yes, the system makes the same procedures as if the person already had a physical valid card. This means that a virtual card number and expire date are returned as described under 1). In this case the expire date will be today's date or a system dependent date.

AD 3. As secure means of payment on the Internet with or without a payment card such as a smart card.

The invention can be used in connection with all kind of customer cards or loyalty cards where a card number identifies the customer. The card company system must have the same functionality as the Internet bank system as described under fields of application 1). This means that the card company must have a system (equivalent to an Internet bank system), which can be accessed via the Internet. Furthermore the card company must also have an invoicing system at his disposal in order to invoice the customer for the purchases made with virtual customer card.

AD 4: As identification of a person or company to another person or company as the invention inherently contains an identification process.

As the invention is based upon the fact that the customer is approved by a bank or a card company, which gives the customer the possibility to pay on the Internet with virtual payment card, then it is possible, that 2 persons or companies can identify themselves to each other by making fictive payments to each other using virtual payment cards, and thereby prove to each other, that they are known and trusted customers of a bank, a card company or similar company. This can be of great importance for B2B commerce.

In general, the invention covers situations, where x number of persons are identifiable 10 via a number (e.g. a card number, a telephone number, a social security number, etc.) located in a database or similar construction. It is necessary, that x is a relative high number and that there is free numbers available. x can be calculated in each particular case.

The invention can then be applied, when the persons mentioned above wants to carry out a function on the Internet normally based on persons identification-number (normally a card number), but said function can now be carried out totally secured, based on the use of short-lived virtual numbers (as described earlier).

The invention can change the existing use of physical payment cards as means of payment on the Internet, as the invention carries the possibility to introduce the ultimate, global virtual payment system for the Internet. The customers can be identified by an international/global number system. As an example the numbering of the virtual card number could be provided in accordance with ISO/IEC 7812 specifying a numbering system for the identification of issuers of identification cards used in international interchange, but without issuing physical cards.

The payment transactions will then be carried out solely based on short-lived, virtual cards as described earlier.

The invention can be exploited by and covers all kinds of electronic equipment which now and in the future can connect to the Internet, this means all kinds of electronic equipment, computer systems, PC's, mobile telephones, WAP-mobile phones, wireless telephones combined with all kinds of debit/credit-/customer cards.

In the following very simplified example the transaction response time for a transaction involving a number of nodes and links is calculated. However, the mentioned duration is only an example as the transaction response time depends on the actual nodes and links, such as the speed of the network and the speed of the interconnected computers.

The charging infrastructure made by the international community comprising banks, credit card institutions etc., consist of hubs interconnected by high-speed communication networks adapted for up to or even more than 2 megabit per second.

A typical verification transaction has a length of max. 100 characters corresponding to 1000 bit. On a 2 Mbit link the transaction requires approximately 4 milliseconds and with a transmission protocol overhead approximately 10 milliseconds corresponding to 100 transactions per second (on a 2 Mbit link).

The total response time for a transaction depends on the number of links to be passed between the sending system A and the receiving system B and back to the system A and also depends on the processing time in each system being passed between system A and system B.

As not all communication links presently are of the 2 Megabit type, it is typically necessary to add a certain overhead to the above described communication response time.

By means of modern high speed network of the virtual payment card numbers, or by means of extensive use of devices such as cellular phones capable of creating valid virtual card numbers based on rules or algorithms, the total transaction time including validation and cancelling of the card number may easily take down to less than 10 milliseconds.

The above mentioned fields of application must however in no way be considered as being limited to these, as new fields of application can be constructed based on the invention.

The invention claimed is:

1. A method for performing a *secure* transaction between a legal entity A who has an approval to perform such transaction, and a legal entity B over a network, the transaction being initiated by the legal entity A, *wherein the method is implemented in a computing system, the method* comprising the steps of:

the legal entity A, associating the transaction with a digital verification insignia to verify the approval to the legal entity B, the verification insignia being a unique transitory insignia valid for a single transaction and valid only for a prespecified time to complete a transaction provided to the legal entity A by a legal entity C who thereby guarantees that the legal entity A has the approval, providing the unique transitory insignia to the legal entity A by the legal entity C for said single transaction before said transaction being conditioned by the legal entity A providing to the legal entity C a secret identification code confirming the identity of the legal entity A to the legal entity C, the legal entity B validating through legal entity C the unique transitory insignia, and upon positive validation, and only then, accepts the transactions, and the legal entity C invalidating the transitory unique insignia upon completion of the transaction.

2. A method according to claim 1, wherein the validation is guaranteed by the legal entity C and wherein the legal entity C upon the guaranteeing invalidates the unique transitory insignia.

3. A method according to claim 1, wherein a first timestamp is recorded by the legal entity C, the first timestamp comprising the date and time of the provision of the unique transitory insignia to the legal entity A by the legal entity C.

4. A method according to claim 3, wherein a second timestamp is recorded by the legal entity A, the second timestamp comprising the date and time when the legal entity A, to verify the approval to the legal entity B, associates the transaction with a verification insignia.

5. A method according to claim 4, wherein the unique transitory insignia comprises the first timestamp and/or the second timestamp.

6. A method according to claim 3, wherein the transitory unique insignia is invalidated by the legal entity C after a prespecified time T counted from the time recorded in the timestamp.

7. A method according to claim 6, wherein the prespecified time T equals a transmission time of the unique transitory insignia from legal entity C to legal entity A plus a processing and maximum handling time at legal entity A, plus a transmission time of the unique transitory insignia from legal entity A to legal entity B, plus a processing time at legal entity B, plus a transmission time of the unique transitory insignia from legal entity B to legal entity C plus a processing time at the legal entity C.

8. A method according to claim 1, wherein at least one of the following events is recorded by the legal entity C:

the provision of the unique transitory insignia, the association of the transaction with the verification insignia, the verifying of the correctness of the unique transitory insignia, and the time when the transitory unique insignia is being invalidated.

9. A method according to claim 1, wherein the public network is the internet or any other public, semi-public, private or semi-private network.

10. A method according to claim 9, wherein the network uses a wireless application protocol.

11. A method according to claim 1, wherein the verification insignia is a provided to the legal entity A by the legal entity C over the Internet through a secure communication channel protected by the secret identification code.

12. A method according to claim 1, wherein the unique transitory insignia has a unique identification number.

13. A method according to claim 1, wherein the unique identification number is associated with a financial agreement between the legal entity A and a trusted partner of the legal entity C.

14. A method according to claim 13, wherein the financial agreement comprises the trusted partner of the legal entity C providing the legal partner A with a payment card.

15. A method according to claim 13, wherein the unique identification number comprises at least a first and a second identification component, the first identification component identifying the financial agreement and the second identification component identifying the legal entity C.

16. A method according to claim 15, wherein the second identification component is assigned to the legal entity C by a registration authority agreed between the legal entity C and a number of trusted partners of the legal entity C.

17. A method according claim 15, wherein there is an interdependency between the financial agreement and a disbursement account.

18. A method according to claim 1, wherein *the legal entity B requests payment from* the legal entity C[is requested a payment entity B], the request being associated with the unique transitory insignia.

19. A method according to claim 17, wherein the payment is withdrawn from the disbursement account.

20. A method according to claim 14, wherein the unique number is selected in accordance with a unique number of the payment card.

21. A method according to claim 14, wherein the unique number is selected in accordance with a unique issuer identification number of the legal entity C or in accordance with unique identification number of trusted partner(s) of the legal entity C.

22. A method according to claim 12, wherein the unique identification number is selected from a pool of numbers agreed between the legal entity C and the trusted partners of the legal entity C, and wherein the number is released after the transitory unique insignia has been invalidated.

23. A method according to claim 1, wherein the unique transitory insignia is comprised in a digital code.

24. A method according to claim 23, wherein the digital code is generated in a cellular phone, by means of a digital device provided by the legal entity C.

25. A method according to claim 23, wherein the digital code is encrypted.

26. The method according to claim 6, wherein the prespecified time is between 30 seconds and 4 minutes.

27. The method according to claim 6, wherein in the prespecified time is 2 minutes.

28. A method for securing an electronic transaction, comprising the steps of:

providing a computer based system for transmission of a transaction between a legal entity A who has an approval to perform a transaction and a legal entity B over an electronic communication network, the transaction being initiated by legal entity A;

legal entity A associating the transaction with a verification insignia to verify the approval to legal entity B, the verification insignia being a unique transitory insignia valid for a single transaction and valid only for a prespecified time to complete the transaction, the verification insignia including a unique digital code and optionally one or more of (1) a unique identification code which identifies the agreement between legal entity A and legal entity C, and (2) a time stamp identifying the exact date and time when the unique transitory insignia is assigned and transmitted by legal entity C to legal entity A;

providing the transitory insignia by legal entity C, who thereby guarantees that legal entity A has the approval, conditioned by legal entity A providing to legal entity C a secret identification code confirming the identity of legal entity A to legal entity C;

starting a timer when assigning the unique transitory insignia, legal entity C or a trusted partner of legal entity C transmitting the unique transitory insignia to legal entity A through a secure communication channel;

legal entity B validating through legal entity C the unique transitory insignia and upon positive validation and only then accepting the transaction; and legal entity C invalidating the unique transitory insignia upon completion of the transaction;

so that the receiver of the transaction has the possibility to verify on-line, the sender's legal rights to perform such a transaction.

29. The method according to claim 28, wherein the unique transitory insignia is invalidated by legal entity C when the unique transitory insignia is presented for validation or after a system dependent and prespecified time limit T as counted by the timer without the unique transitory insignia has been presented for legal entity C for validation.

30. A method for performing a *secure* transaction between a legal entity A who has an approval to perform such transaction, and a legal entity B over a network, the transaction being initiated by the legal entity A, *where the method is implemented in a computing system, the method* comprising the steps of:

the legal entity A, associating the transaction with a digital verification insignia to verify the approval to the legal entity B, the verification insignia being a unique transitory insignia valid for a single transaction and valid only for a prespecified time to complete a transaction provided to the legal entity A by a legal entity C who thereby guarantees that the legal entity A has the approval, providing the unique transitory insignia to the legal entity A by the legal entity C for said single transaction before said transaction being conditioned by the legal entity A providing to the legal entity C a secret identification code confirming the identity of the legal entity A to the legal entity C, the provision of the unique transitory insignia being transmitted through a different secure communication channel than the provision of the secret identification code, the legal entity B validating through legal entity C the unique transitory insignia, and upon positive validation, and only then, accepts the transactions, and the legal entity C invalidating the transitory unique insignia upon completion of the transaction.

31. A method for securing an electronic transaction, comprising the steps of:

providing a computer based system for transmission of a transaction between a legal entity A who has an approval to perform a transaction and a legal entity B over an electronic communication network, the transaction being initiated by legal entity A;

legal entity A associating the transaction with a verification insignia to verify the approval to legal entity B, the verification insignia being a unique transitory insignia valid for a single transaction and valid only for a prespecified time to complete the transaction, the verification insignia including a unique digital code and optionally one or more of (1) a unique identification code which identifies the agreement between legal entity A and legal entity C, and (2) a time stamp identifying the exact date and time when the unique transitory insignia is assigned and transmitted by legal entity C to legal entity A;

providing the transitory insignia by legal entity C, who thereby guarantees that legal entity A has the approval, conditioned by legal entity A providing to legal entity C a secret identification code confirming the identity of legal entity A to legal entity C, the provision of the unique transitory insignia being transmitted through a different secure communication channel than the provision of the secret identification code;

starting a timer when assigning the unique transitory insignia, legal entity C or a trusted partner of legal entity C transmitting the unique transitory insignia to legal entity A through a secure communication channel;

legal entity B validating through legal entity C the unique transitory insignia and upon positive validation and only then accepting the transaction; and legal entity C invalidating the unique transitory insignia upon completion of the transaction;

so that the receiver of the transaction has the possibility to verify on-line, the sender's legal fights to perform such a transaction.

*32. A method implemented in a computing system having a communications device, the method comprising:*

*with the communications device, transmitting a secret identification code to a confirming entity effective to confirm an identity of a transmitting entity that transmitted the secret identification code;*

*responsive to transmitting the secret identification code, receiving, from the confirming entity, a time-limited unique transitory insignia that is valid for a single transaction;*

*enabling initiation of a transaction with a transaction entity;*

*receiving an association of the transaction with the time-limited unique transitory insignia, the time-limited unique transitory insignia being configured to verify approval of the transaction to the transaction entity;*

*transmitting the time-limited unique transitory insignia to the transaction entity effective to enable transacting the transaction; and*

*causing the unique transitory insignia to be invalidated upon completion of the transaction.*

*33. The method of claim 32, wherein the time-limited unique transitory insignia comprises one or more time stamps.*

*34. The method of claim 32, wherein the time-limited unique transitory insignia comprises a unique identification number that is associated with a financial agreement.*

*35. The method of claim 34, wherein the financial agreement is related to a bank account or a disbursement account.*

*36. The method of claim 32, wherein the time-limited unique transitory insignia comprises a unique identification number having at least a first and a second identification component, the first identification component identifying a financial agreement, the second identification component identifying an entity other than the transmitting entity.*

*37. The method of claim 36, wherein the entity other than the transmitting entity comprises the confirming entity.*

*38. The method of claim 36, wherein the entity other than the transmitting entity comprises a trusted partner of the confirming entity.*

*39. The method of claim 32 further comprising invalidating the time-limited unique transitory insignia.*

*40. The method of claim 32 further comprising invalidating the time-limited unique transitory insignia responsive to receiving a confirmation from the transaction entity.*

*41. The method of claim 32, wherein at least one of transmitting the secret identification code or transmitting the time-limited unique transitory insignia is performed using a wireless network.*

*42. The method of claim 32, wherein at least one of transmitting the secret identification code or transmitting the time-limited unique transitory insignia is performed using the Internet.*

*43. The method of claim 32, wherein at least one of transmitting the secret identification code or transmitting the time-limited unique transitory insignia is performed using a mobile phone.*

*44. A computer storage device having instructions stored thereon that, if executed by a computing device, cause the computing device to perform a method comprising:*

*transmitting a secret identification code to a confirming entity effective to confirm an identity of a transmitting entity that transmitted the secret identification code;*

*responsive to transmitting the secret identification code, receiving, from the confirming entity, a time-limited unique transitory insignia that is valid for a single transaction;*

*enabling initiation of a transaction with a transection entity;*

*receiving an association of the transaction with the time-limited unique transitory insignia, the time-limited unique transitory insignia being configured to verify approval of the transaction to the transaction entity;*

*transmitting the time-limited unique transitory insignia to the transaction entity effective to enable transacting the transaction; and*

*causing the unique transitory insignia to be invalidated upon completion of the transaction.*

*45. The computer storage device of claim 44, wherein the time-limited unique transitory insignia comprises one or more time stamps.*

*46. The computer storage device of claim 44, wherein the time-limited unique transitory insignia comprises a unique identification number that is associated with a financial agreement.*

*47. The computer storage device of claim 44, wherein the time-limited unique transitory insignia comprises a unique identification number having at least a first and a second identification component, the first identification component identifying a financial agreement, the second identification component identifying an entity other than the transmitting entity.*

*48. The computer storage device of claim 44, wherein at least one of transmitting the secret identification code or transmitting the time-limited unique transitory insignia is performed using a wireless network.*

*49. The computer storage device of claim 44, wherein at least one of transmitting the secret identification code or transmitting the time-limited unique transitory insignia is performed using the Internet.*

*50. The computer storage device of claim 44, wherein at least one of transmitting the secret identification code or transmitting the time-limited unique transitory insignia is performed using a mobile phone.*

*51. A method implemented in a computing system having a communications device, the method comprising:*

*receiving, from a customer, an initiation of a transaction;*

*receiving, as part of the transaction, a virtual payment card number, the virtual payment card number being time-limited and valid for a single transaction;*

*with the communications device, transmitting the virtual payment card number to a confirming entity;*

*responsive to validation of the virtual payment card number by the confirming entity, enabling completion of the transaction; and*

*causing the virtual payment card number to be invalidated upon completion of the transaction.*

*52. The method of claim 51, wherein the receiving the initiation of the transaction, receiving the virtual payment card number, transmitting the virtual payment card number, and enabling completion of the transaction are performed, at least in part, on behalf of a service provider.*

*53. A method implemented in a computing system having a communications device, the method comprising:*

*receiving a secret identification code associated with a customer;*

*verifying the customer using the secret identification code;*

*responsive to verifying the customer, with the communications device, transmitting a time-limited unique transitory insignia to the customer, the time-limited unique transitory insignia being valid for a single transaction;*

*receiving a request to validate the time-limited unique transitory insignia in connection with a customer transaction;*

*transmitting an indication that the time-limited unique transitory insignia is valid to an entity from which the request to validate was received; and*

*invalidating the time-limited unique transitory insignia upon completion of the transaction.*

*54. The method of claim 53, wherein the invalidating is performed using one or more time stamps associated with the time-limited unique transitory insignia.*

*55. The method of claim 53, wherein the invalidating is performed responsive to completion of the customer transaction.*

*56. The method of claim 53, wherein the time-limited unique transitory insignia comprises a unique identification number that is associated with a financial agreement.*

*57. The method of claim 56, wherein the financial agreement is related to a bank account or a disbursement account.*

*58. The method of claim 53, wherein the time-limited unique transitory insignia comprises a unique identification number having at least a first and a second identification component, the first identification component identifying a financial agreement, the second identification component identifying an entity other than the customer.*

*59. The method of claim 53, wherein the receiving the secret identification code, verifying the customer, transmitting the time-limited unique transitory insignia, receiving the request, transmitting the indication, and invalidating the time-limited unique transitory insignia are performed on behalf of one or more companies administering payment cards.*

*60. A computer storage device having instructions stored thereon that, if executed by a computing device, cause the computing device to perform a method comprising:*

*receiving a secret identification code associated with a customer;*

*verifying the customer using the secret identification code;*

*responsive to verifying the customer, transmitting a time-limited unique transitory insignia to the customer, the time-limited unique transitory insignia being valid for a single transaction;*

*receiving a request to validate the time-limited unique transitory insignia in connection with a customer transaction;*

*transmitting an indication that the time-limited unique transitory insignia is valid to an entity from which the request to validate was received; and*

*invalidating the time-limited unique transitory insignia upon completion of the transaction.*

*61. The computer storage device of claim 60, wherein the invalidating is performed using one or more time stamps associated with the time-limited unique transitory insignia.*

*62. The computer storage device of claim 60, wherein the invalidating is performed responsive to completion of the customer transaction.*

*63. The computer storage device of claim 60, wherein the time-limited unique transitory insignia comprises a unique identification number that is associated with a financial agreement.*

*64. The computer storage device of claim 63, wherein the financial agreement is related to a bank account or a disbursement account.*

*65. The computer storage device of claim 60, wherein the time-limited unique transitory insignia comprises a unique identification number having at least a first and a second identification component, the first identification component identifying a financial agreement, the second identification component identifying an entity other than the customer.*

*66. The computer storage device of claim 60, wherein the receiving the secret identification code, verifying the customer, transmitting the time-limited unique transitory insignia, receiving the request, transmitting the indication, and invalidating the time-limited unique transitory insignia are performed on behalf of one or more companies administering payment cards.*

*67. A method implemented in a computing system having a communications device, the method comprising:*

*with the communications device, transmitting a request for an Internet payment tool to an entity from which the Internet payment tool can be received; and*

*responsive to transmitting the request, receiving a virtual payment card number having an expiration date, wherein the virtual payment card number is configured to be invalidated at least:*

*after use of the virtual payment card number by a customer, or*

*after a first shop has tried to validate the virtual payment card number.*

*68. The method of claim 67 further comprising transmitting the virtual payment card number to an Internet shop as part of a transaction.*

*69. A computer storage device having instructions stored thereon that, if executed by a computing device, cause the computing device to perform a method comprising:*

*transmitting a request for an Internet payment tool to an entity from which the Internet payment tool can be received; and*

*responsive to transmitting the request, receiving a virtual payment card number having an expiration date, wherein the virtual payment card number is configured to be invalidated at least:*

*after use of the virtual payment card number by a customer, or*

*after a first shop has tried to validate the virtual payment card number.*

*70. The computer storage device of claim 69, wherein the instructions, if executed by the computing device, cause the computing device to perform a method further comprising transmitting the virtual payment card number to an Internet shop as part of a transaction.*

*71. A method implemented in a computing system having a processor, the method comprising:*

*receiving a request for an Internet payment tool from a customer, wherein the customer has an existing relationship with an entity that receives the request;*

*with the processor, allocating a virtual payment card to the customer;*

*causing information associated with the virtual payment card to be logged in a file;*

*marking the virtual payment card as being in use by the customer;*

*activating a timer associated with the virtual payment card;*

*returning the virtual payment card to the customer; and*

*causing the virtual payment card to be invalidated upon expiration of the activated timer.*

*72. The method of claim 71, wherein the existing relationship pertains to an existing physical payment card issued to the customer.*

*73. The method of claim 72 further comprising maintaining a database system that provides an association between an existing physical payment card issued to the customer and one or more virtual payment cards issued to the customer.*

*74. The method of claim 71, wherein the virtual payment card is valid either for a certain time period associated with the timer or until a transaction associated with the virtual payment card has taken place.*

*75. The method of claim 71 further comprising:*

*receiving a request from an Internet-based goods or services provider for verification of the virtual payment card;*

*validating the virtual payment card; and*

*returning a confirmation to an entity from which the request for verification was received.*

*76. The method of claim 71 further comprising:*

*receiving a request from an Internet-based goods or services provider for verification of the virtual payment card;*

*validating the virtual payment card;*

*returning a confirmation to an entity from which we request for verification was received; and*

*responsive to validating the virtual payment card, disabling use of the virtual payment card for one or more transactions beyond a transaction associated with the request for verification.*

*77. The method of claim 71 further comprising responsive to a settlement transaction taking place with respect to the virtual payment card, deleting an association between the virtual payment card and the customer.*

*78. The method of claim 71 further comprising:*

*responsive to a settlement transaction taking place with respect to the virtual payment card, deleting an association between the virtual payment card and the customer; and*

*in connection with deleting the association, allocating the virtual payment card for another transaction associated with another customer.*

*79. A computer storage device including a non-transitory computer-readable medium having instructions stored*

*thereon that, if executed by a computing device, cause the computing device to perform a method comprising:*

*receiving a request for an Internet payment tool from a customer, wherein the customer has an existing relationship with an entity that receives the request; allocating a virtual payment card to the customer;*

*causing information associated with the virtual payment card to be logged in a file;*

*marking the virtual payment card as being in use by the customer;*

*activating a timer associated with the virtual payment card;*

*returning the virtual payment card to the customer; and*

*causing the virtual payment card to be invalidated upon expiration of the activated timer.*

*80. The computer storage device of claim 79, wherein the existing relationship pertains to an existing physical payment card issued to the customer.*

*81. The computer storage device of claim 80, wherein the instructions, if executed by the computing device, cause the computing device to perform a method further comprising maintaining a database system that provides an association between an existing physical payment card issued to the customer and one or more virtual payment cards issued to the customer.*

*82. The computer storage device of claim 79, wherein the virtual payment card is valid either for a certain time period associated with the timer or until a transaction has taken place for the virtual payment card.*

*83. The computer storage device of claim 79, wherein the instructions, it executed by the computing device, cause the computing device to perform a method further comprising receiving a request from an Internet-based goods or services provider for verification of the virtual payment card.*

*84. The computer storage device of claim 79, wherein the instructions, if executed by the computing device, cause the computing device to perform a method further comprising:*

*receiving a request from an Internet-based goods or services provider for verification of the virtual payment card;*

*validating the virtual payment card; and*

*returning a confirmation to an entity from which the request for verification was received.*

*85. The computer storage device of claim 79, wherein the instructions, if executed by the computing device, cause the computing device to perform a method further comprising:*

*receiving a request from an Internet-based goods or services provider for verification of the virtual payment card;*

*validating the virtual payment card;*

*returning a confirmation to an entity from which the request for verification was received; and*

*responsive to validating the virtual payment card, disabling use of the virtual payment card for one or more transactions beyond a transaction associated with the request for verification.*

*86. The computer storage device of claim 79 wherein the instructions, if executed by the computing device, cause the computing device to perform a method further comprising responsive to a settlement transaction taking place with respect to the virtual payment card, deleting an association between the virtual payment card and the customer.*

*87. The computer storage device of claim 79 wherein the instructions, if executed by the computing device, cause the computing device to perform a method further comprising:*

*responsive to a settlement transaction taking place with respect to the virtual payment card, deleting an association between the virtual payment card and the customer; and*

*responsive to deleting the association, allocating the virtual payment card for an other transaction associated with an other customer.*

* * * * *

UNITED STATES PATENT AND TRADEMARK OFFICE

CERTIFICATE OF CORRECTION

PATENT NO. : RE43,440 E
APPLICATION NO. : 12/362953
DATED : May 29, 2012
INVENTOR(S) : Jespersen et al.

It is certified that error appears in the above-identified patent and that said Letters Patent is hereby corrected as shown below:

In Column 5, Line 49, delete "as" and insert -- has --, therefor.

In Column 10, Line 15, delete "there" and insert -- their --, therefor.

In Column 13, Line 67, in Claim 11, delete "is a" and insert -- is [a] --, therefor.

In Column 14, Line 52, in Claim 27, delete "in the" and insert -- the --, therefor.

In Column 17, Line 31, in Claim 44, delete "transection" and insert -- transaction --, therefor.

In Column 20, Line 48, in Claim 76, delete "we" and insert -- the --, therefor.

Signed and Sealed this
Ninth Day of April, 2013

Teresa Stanek Rea

Teresa Stanek Rea
*Acting Director of the United States Patent and Trademark Office*